(12) United States Patent
Simmons et al.

(10) Patent No.: US 10,094,450 B2
(45) Date of Patent: Oct. 9, 2018

(54) ROTATIONAL TENSIONER WITH STORED ENERGY AND DAMPING FEATURE

(71) Applicant: BorgWarner Inc., Auburn Hills, MI (US)

(72) Inventors: Sean R. Simmons, Cortland, NY (US); Simon Barrette, Lansing, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/504,067

(22) PCT Filed: Aug. 18, 2015

(86) PCT No.: PCT/US2015/045617
§ 371 (c)(1),
(2) Date: Feb. 15, 2017

(87) PCT Pub. No.: WO2016/028730
PCT Pub. Date: Feb. 25, 2016

(65) Prior Publication Data
US 2017/0248204 A1      Aug. 31, 2017

Related U.S. Application Data

(60) Provisional application No. 62/039,503, filed on Aug. 20, 2014.

(51) Int. Cl.
| | |
|---|---|
| *F16H 7/12* | (2006.01) |
| *F16H 7/08* | (2006.01) |
| *F16H 7/18* | (2006.01) |

(52) U.S. Cl.
CPC ......... *F16H 7/0838* (2013.01); *F16H 7/0831* (2013.01); *F16H 7/1218* (2013.01);
(Continued)

(58) Field of Classification Search
CPC ............. F16H 2007/081; F16H 7/1218; F16H 2007/084; F16H 2007/0893; F16H 7/1281
(Continued)

(56) References Cited

U.S. PATENT DOCUMENTS

| | | | | |
|---|---|---|---|---|
| 4,285,676 A | * | 8/1981 | Kraft | ..................... F16H 7/1281 267/155 |
| 4,504,254 A | * | 3/1985 | Foster | ................... F16H 7/1245 29/452 |

(Continued)

FOREIGN PATENT DOCUMENTS

| | | |
|---|---|---|
| CN | 1839271 A | 9/2006 |
| CN | 102472372 A | 5/2012 |

(Continued)

OTHER PUBLICATIONS

International Search Report for PCT/US2015/045617 dated Oct. 16, 2015.
(Continued)

*Primary Examiner* — Henry Y Liu
(74) *Attorney, Agent, or Firm* — Brown & Michaels, PC

(57) ABSTRACT

A tensioner uses a low rate torsion spring in a first stage and a high rate torsion spring in a second stage to maintain tension in a chain or belt. The first stage is connected to the second stage by a torque coupling. The high rate torsion spring is maintained in an energized state between a ground and a dead stop to store energy and to provide tension under high loads. In some embodiments, the torque coupling is a damper. In other embodiments, the torque coupling is a clutch. A method stores energy in a high rate torsion spring of a tensioner.

14 Claims, 4 Drawing Sheets

(52) U.S. Cl.
CPC ............... *F16H 7/18* (2013.01); *F16H 7/08* (2013.01); *F16H 7/1209* (2013.01); *F16H 2007/081* (2013.01); *F16H 2007/185* (2013.01)

(58) Field of Classification Search
USPC ....................................................... 474/135
See application file for complete search history.

(56) References Cited

U.S. PATENT DOCUMENTS

| | | | | |
|---|---|---|---|---|
| 4,582,653 A * | 4/1986 | Blanchard | ............. | F02M 19/12 123/198 D |
| 4,826,471 A * | 5/1989 | Ushio | ................... | F16H 7/1281 474/135 |
| 4,917,655 A * | 4/1990 | Martin | ................... | F16H 7/1218 474/112 |
| 5,011,460 A * | 4/1991 | Ouchi | ................... | F16H 7/1245 474/133 |
| 5,195,932 A * | 3/1993 | Hirai | ................... | F16H 7/1218 474/135 |
| 5,370,586 A * | 12/1994 | Thomsen | ............. | F16H 7/1281 267/155 |
| 5,620,385 A * | 4/1997 | Cascionale | ........... | F16H 7/1218 474/112 |
| 5,964,674 A * | 10/1999 | Serkh | ................... | F16H 7/1218 474/101 |
| 5,967,919 A * | 10/1999 | Bakker | ................ | F16H 7/1218 474/115 |
| 6,264,578 B1 * | 7/2001 | Ayukawa | ............. | F16H 7/1218 474/109 |
| 6,375,588 B1 * | 4/2002 | Frankowski | .......... | F16H 7/1227 474/101 |
| 6,582,332 B2 * | 6/2003 | Serkh | ................... | F16H 7/1218 474/109 |
| 6,594,282 B1 | 7/2003 | Kynast et al. | | |
| 6,932,731 B2 * | 8/2005 | Kaiser | ................... | F16H 7/1218 474/112 |
| 7,217,207 B1 * | 5/2007 | Hallen | ................... | F16H 7/129 474/101 |
| 7,901,309 B2 * | 3/2011 | Lehtovaara | ............... | F16H 7/08 474/109 |
| 7,980,976 B2 * | 7/2011 | Stepniak | ............... | F16H 7/1281 384/215 |
| 8,052,559 B2 * | 11/2011 | Wigsten | ................ | F16H 7/0831 474/109 |
| 8,092,328 B2 * | 1/2012 | Dec | ........................ | F16H 7/1218 474/135 |
| 8,613,680 B2 * | 12/2013 | Frankowski | .......... | F16H 7/1218 474/133 |
| 8,932,163 B2 * | 1/2015 | Fittro | ..................... | F16H 7/1281 474/135 |
| 9,175,753 B2 | 11/2015 | Frankowski et al. | | |
| 9,212,731 B2 * | 12/2015 | Lindstrom | ............ | F16H 7/1218 474/135 |
| 2002/0010045 A1 * | 1/2002 | Serkh | ..................... | F16H 7/1218 474/135 |
| 2005/0043130 A1 | 2/2005 | Hao et al. | | |
| 2005/0181902 A1 * | 8/2005 | Konanz | .................. | F16H 7/1218 474/135 |
| 2006/0100049 A1 * | 5/2006 | Lannutti | ............... | F16H 7/1218 474/133 |
| 2007/0249446 A1 * | 10/2007 | Hao | ...................... | F16H 7/1218 474/135 |
| 2011/0015017 A1 * | 1/2011 | Serkh | ................... | F16H 7/1218 474/135 |
| 2011/0256969 A1 * | 10/2011 | Frankowski | .......... | F16H 7/1218 474/101 |
| 2011/0312454 A1 * | 12/2011 | Comsa | ..................... | F01L 1/02 474/110 |
| 2014/0287859 A1 * | 9/2014 | Frankowski | ............ | F02B 67/06 474/135 |
| 2015/0031485 A1 * | 1/2015 | Lindstrom | ............ | F16H 7/1218 474/135 |

FOREIGN PATENT DOCUMENTS

| | | |
|---|---|---|
| JP | 05-196104 A | 8/1993 |
| JP | H05196104 A | 8/1993 |
| JP | 2000018346 A | 1/2000 |
| JP | 2012530235 A | 11/2012 |
| KR | 100591971 B1 | 6/2006 |
| KR | 20130061137 A | 6/2013 |
| WO | WO2008031687 A1 | 3/2008 |
| WO | 2011002718 A1 | 1/2011 |

OTHER PUBLICATIONS

First Office Action for PCT/US2015/045617/CN201580042875.0 dated Jul. 3, 2017, by the State Intellectual Property Office of China.
Search Report for PCT/US2015/045617/CN201580042875.0 dated Jun. 23, 2017, by the State Intellectual Property Office of China.
First Office Action for PCT/US2015/045617/JP2017-507429 dated Jun. 21, 2017, by the Japanese Patent Office.

\* cited by examiner

ROTATIONAL TENSIONER WITH STORED ENERGY AND DAMPING FEATURE

BACKGROUND OF THE INVENTION

Field of the Invention

The invention pertains to the field of tensioners. More particularly, the invention pertains to a tensioner with stored energy.

Description of Related Art

During the operational lifetime of a chain or belt, the chain or belt elongates, causing an increase in slack, and the chain or belt is also subject to variations in tension, both of which reduce the operational efficiency and may cause loss of control. A tensioner is used to contact a strand of the chain or belt to maintain tension in the strand during operation of the chain or belt.

U.S. Pat. No. 7,901,309, entitled "Tensioner for a Timing Chain" and issued Mar. 8, 2011 to Lehtovaara et al., discloses a tensioner with a base plate and a pivot arm. One end of the pivot arm is pivotally mounted to the base plate for rotation about a first axis. A spring biases the pivot arm to rotate in a tensioning direction. A push rod assembly is pivotally mounted to the other end of the pivot arm. The push rod assembly is rotatable about a second axis extending parallel to the first axis. The push rod assembly frictionally engages the pivot arm, generating frictional forces counteracting and damping the spring bias. When the tensioning guide is forced to rotate in the tensioning direction, the acting moment arm of the push rod, causes the guide to rotate towards the endless drive. The acting moment arm is considerable longer at the end of the tensioning stroke than in the beginning of the stroke.

U.S. Pat. No. 8,052,559, entitled "Tensioner with Two Way Damper" and issued Nov. 8, 2011 to Wigsten et al., discloses a tensioner for a power transmission system with two tensioning arms operatively engaged with the strand of the chain or the belt of the power transmission system. The upper end of each tensioning arm is connected to a two way damper, which is pivotally mounted between the upper ends of the tensioning arms. When a pre-determined chain tension overload threshold is reached, the damper allows the tensioner to adjust the tension in the chain with minimal oscillations and minimal phase change variation. The tension overload threshold is the amount of torque required to overcome the coefficient of friction.

The above-mentioned references are hereby incorporated by reference herein.

SUMMARY OF THE INVENTION

A tensioner uses a low rate torsion spring in a first stage and a high rate torsion spring in a second stage to maintain tension in a chain or belt. The first stage is connected to the second stage by a torque coupling. The high rate torsion spring is maintained in an energized state between a ground and a dead stop to store energy and to provide tension under high loads. In some embodiments, the torque coupling is a damper. In other embodiments, the torque coupling is a clutch.

In some embodiments, a tensioner includes a first stage, a torque coupling, and a second stage. The first stage includes an arm and a low rate torsion spring. The arm includes an arm body and a first ground. The arm body has a first end extending outwardly from a second end pivotable around a pivot axis and receives torque applied by a load from a chain or belt. The first ground extends from the arm body parallel to the pivot axis. The low rate torsion spring is mounted around the pivot axis and has a first end contacting the first ground to resist rotation of the arm in a first direction around the pivot axis. The torque coupling is mounted around the pivot axis and receives torque from the first stage.

The second stage receives torque transmitted by the torque coupling. The second stage includes a second stage housing, a high rate torsion spring, a dead stop, and a second ground. The second stage housing is rotatable about the pivot axis and has a spring trap. The high rate torsion spring is rotatable with the second stage housing. The high rate torsion spring has a first end extending through the spring trap and a second end opposite the first end. The dead stop is non-rotatable with respect to the pivot axis, extends parallel to the pivot axis, and contacts the first end of the high rate torsion spring when no load is being applied to the arm by the chain or belt. The second ground is non-rotatable with respect to the pivot axis, extends parallel to the pivot axis, and contacts the second end of the high rate torsion spring when no load is being applied to the arm by the chain or belt. The high rate torsion spring is held in an energized state by the dead stop and the second ground when no load is being applied to the arm by the chain or belt.

In some embodiments, a method of storing energy in a high rate torsion spring of a tensioner includes mounting the high rate torsion spring on a second stage housing of the tensioner such that a first end of the high rate torsion spring extends through a spring trap of the second stage housing. The method also includes energizing the high rate torsion spring and pinning the first end of the high rate torsion spring in contact with a dead stop, non-rotatable with respect to the pivot axis and extending parallel to the pivot axis, and the second end of the high rate torsion spring in contact with a second ground, non-rotatable with respect to the pivot axis and extending parallel to the pivot axis, such that the high rate torsion spring is held in an energized state by the dead stop and the second ground when no load is being applied to the arm by the chain or belt.

DETAILED DESCRIPTION OF THE INVENTION

A rotational mechanical tensioner may be used to maintain tension in a chain or belt drive. The tensioner preferably includes a first stage and a second stage. The first stage acts to take up slack using a low rate torsion spring. The second stage acts against high load inputs from the chain or belt drive using a high rate torsion spring. The high rate torsion spring has a spring rate greater than the spring rate of the low rate torsion spring. The spring rate of the high rate torsion spring is preferably about an order of magnitude greater than the spring rate of the low rate torsion spring. In some embodiments, the spring rate ratio of the high rate torsion spring to the low rate torsion spring is in the range of 8:1 to 12:1. In some embodiments, the spring rate ratio is about 10:1. The two stages pivot about a common axis and are connected by a torque coupling. In some embodiments, the torque coupling is a clutch. In some embodiments, the clutch is a slip clutch. In other embodiments, the clutch is a non-slip clutch. In other embodiments, the torque coupling is a damper. In some embodiments, the damper is a slip damper. In other embodiments, the damper is a non-slip damper.

A one-way bearing locks when load is applied by the chain or belt drive, thereby allowing the load to be transmitted from the first stage to the second stage through the clutch or damper. The spring on the second stage is held in an energized state between ground and a dead stop. When torque from the chain or belt drive exceeds the high rate torsion spring torque, the second stage rotates the spring off the dead stop, increasing tensioning force. When torque from the chain or belt drive is less than the high rate torsion spring torque, no energy is transmitted by the high rate torsion spring. In such embodiments, the high rate torsion spring does not transmit load through to the chain or belt drive except in response to high drive loads. Damping is preferably provided by friction during slip under very high loads and by hysteresis damping under all loads. In some embodiments, tension from the chain or belt drive is transmitted through a tensioner arm to a lift arm of the damper.

Figure 1:
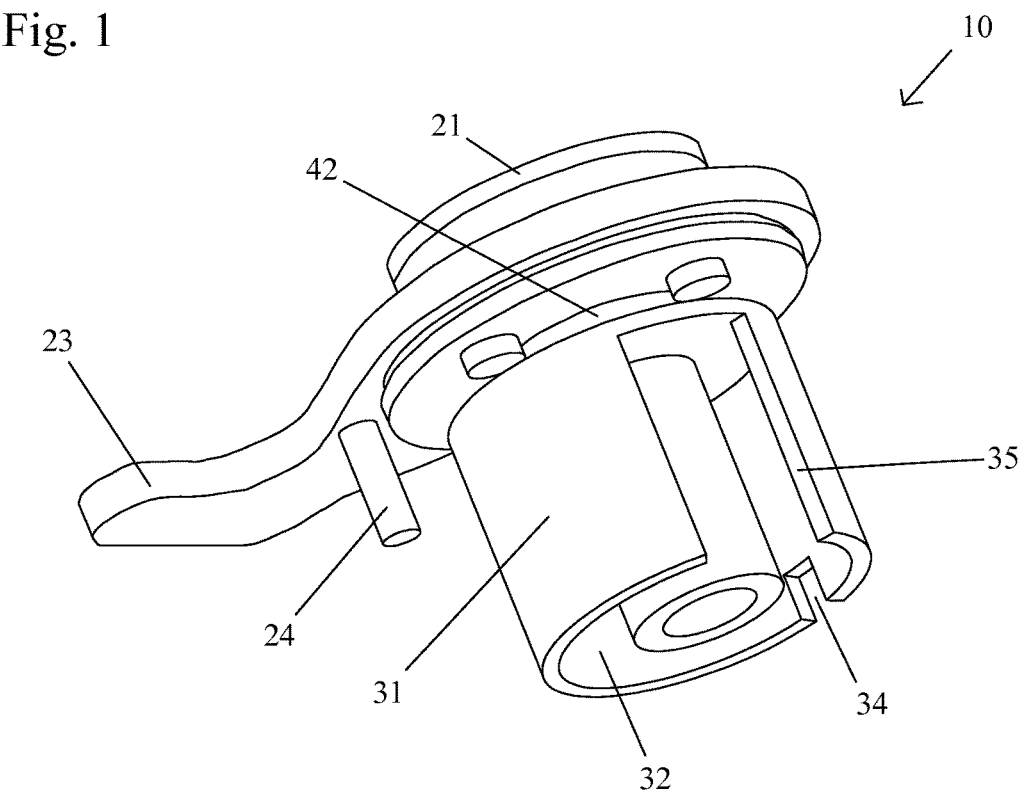
FIG. 1 shows a schematic perspective view of portions of an assembly for a rotational tensioner in an embodiment of the present invention.
Figure 2:
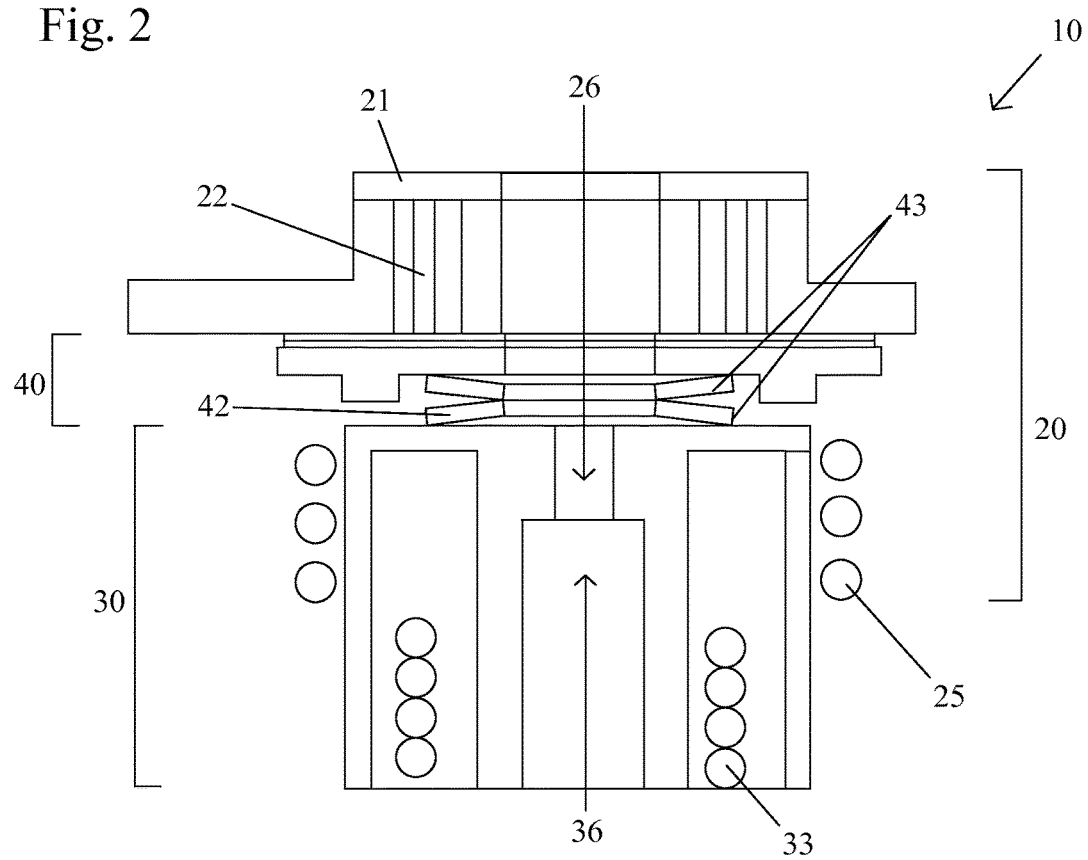
FIG. 2 shows a schematic cross sectional view through the pivot axis of the assembly of FIG. 1.

Referring to FIG. 1 and FIG. 2, the assembly 10 includes a first stage 20 and a second stage 30 coupled together by a clutch assembly 40. In this embodiment, the first and second stages 20, 30 are in a stacked configuration, with the first stage 20 being stacked on top of the second stage 30 with respect to the pivot axis, with the clutch assembly 40 located between the two stages on the pivot axis. The first stage 20 includes a washer 21, a one-way bearing 22, a lift arm 23, a low rate spring ground 24, and a low rate torsion spring 25. The washer 21 is preferably coated with polytetrafluoroethylene. The first stage 20 is attached by a bolt (not shown) to the clutch assembly 40 through a central opening 26 in the first stage 20.

The second stage 30 includes a housing 31 with an annular cylindrical chamber 32 receiving a high rate torsion spring 33. The second stage 30 also includes a spring trap 34 in the wall of the housing 31 and a clearance window 35 in the wall of the housing 31 for biasing the high rate spring 33 to ground. The second stage 30 housing 31 rotates on a pin or bolt (not shown) extending into a central opening 36 in the second stage 30. The high rate spring ground (not shown) and the dead stop (not shown) for the high rate spring 33 are preferably mounted to the non-rotating surface to which the tensioner is mounted.

The clutch 42 transmits torque from the first stage 20 to the second stage 30 at torques below a torque required to cause the clutch to slip. Although not shown in FIG. 1 and FIG. 2, the high rate spring ground and the dead stop are preferably located in a manner similar to that shown in FIG. 3 or FIG. 7, operate in a manner similar to that described with respect to FIG. 7, and may be located directly on a mounting surface or on a mounting plate as shown in FIG. 3.

Figure 3:
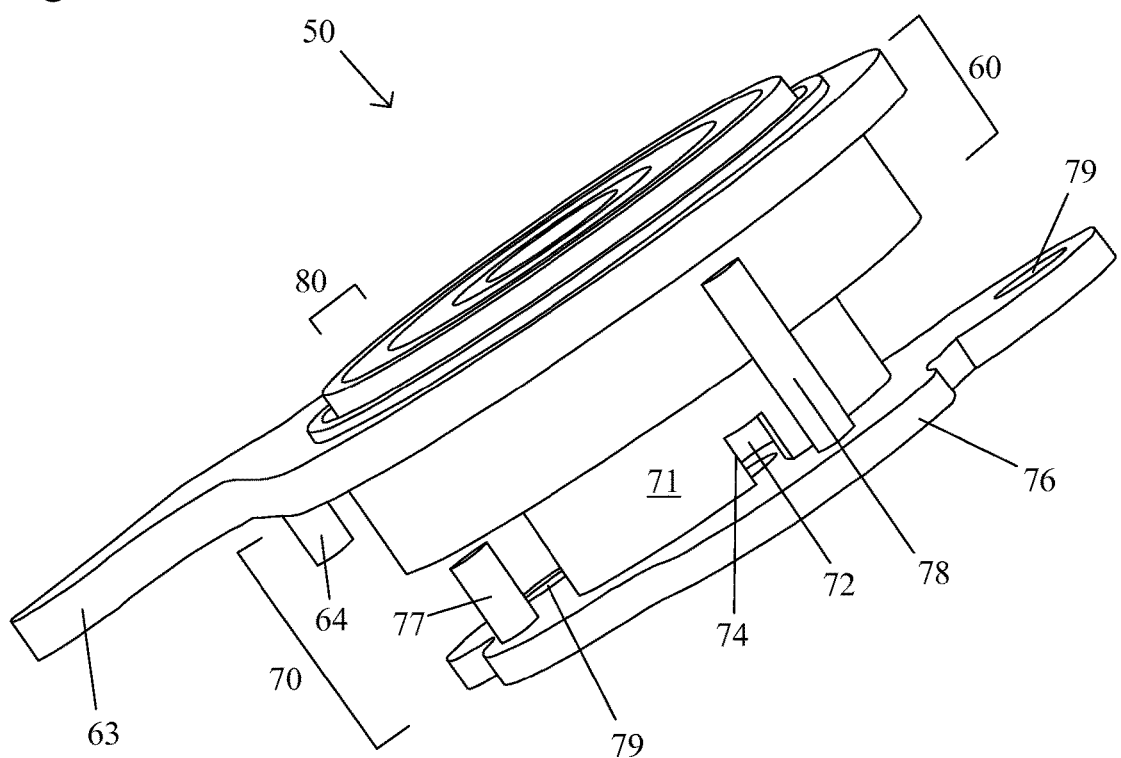
FIG. 3 shows a schematic perspective view of portions of an assembly for a rotational tensioner in another embodiment of the present invention.
Figure 4:
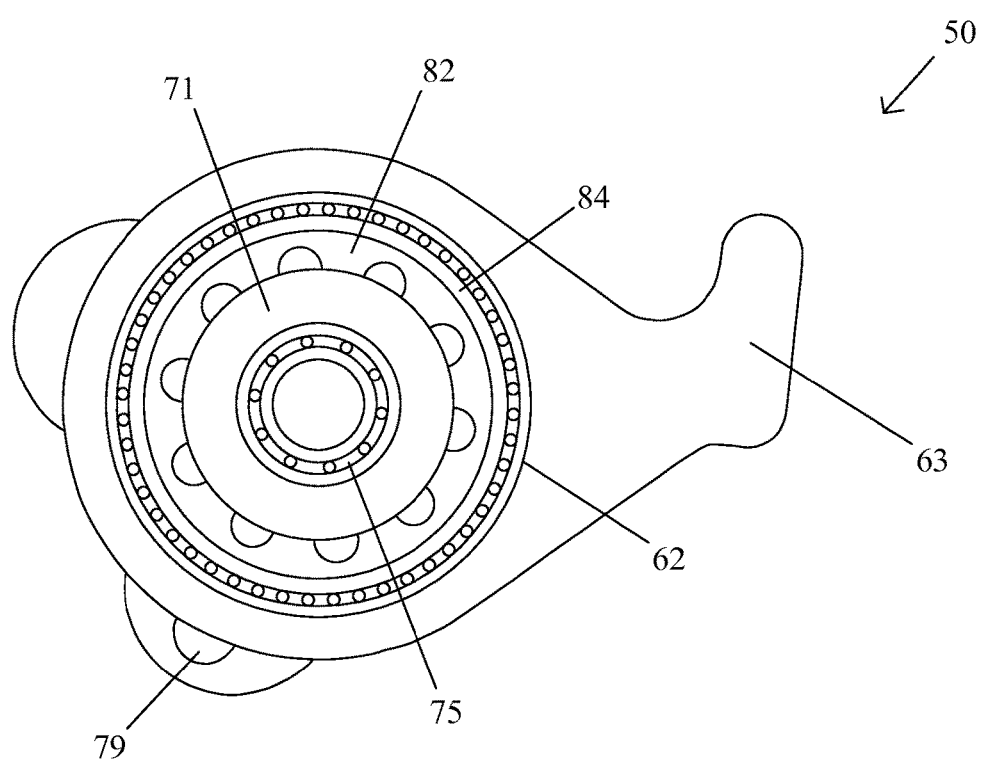
FIG. 4 shows a schematic top view of the assembly of FIG. 3.

Referring to FIG. 3 and FIG. 4, the assembly 50 includes a first stage 60 and a second stage 70 coupled together by a damper assembly 80. In this embodiment, the first and second stages are in a concentric configuration, with the first stage 60 being farther from the pivot axis than the second stage 70, with the damper assembly 80 located radially between the two stages. The first stage 60 includes a one-way bearing 62, a lift arm 63, a low rate spring ground 64, and a low rate torsion spring (not shown).

The second stage 70 includes a housing 71 with an annular cylindrical chamber 72 receiving a high rate torsion spring (not shown). The second stage 70 also includes a spring trap 74 in the wall of the housing 71. A bearing or pivot 75 allows the second stage 70 to rotate with respect to a mounting plate 76, which includes mounting holes 79 for mounting the mounting plate 76 to a surface (not shown). The mounting plate 76 includes a high rate spring ground 77 and a dead stop 78 for the high rate torsion spring.

The damper assembly 80 includes a damper 82 and a damper race 84 and transmits torque from the first stage 60 to the second stage 70 at torques below a torque required to cause the damper assembly 80 to slip. The damper 82 is preferably made of an elastomeric material. In some embodiments, the elastomeric material is an ethylene vinyl acetate (EVA), an acsium alkylated chlorosulfonated polyethylene (ACSM), a polyacrylate (ACM), an ethylene/acrylic (EEA), a fluoroelastomer (FKM), a polychloroprene (CR), an epichlorohydrin ethylene oxide (EEO), a nitrile (NBR), a hydrogenated nitrile rubber (HNBR), a silicone (MQ), a fluorosilicone (FVMQ), a chlorosulfonated polyethylene (CSM), or a perfluoroelastomer (FFKM). Although not shown in FIG. 3 and FIG. 4, the low rate spring and high rate spring are preferably located in a manner similar to that shown in FIG. 2 or FIG. 7 and operate in a manner similar to that described with respect to FIG. 7.

Figure 5:
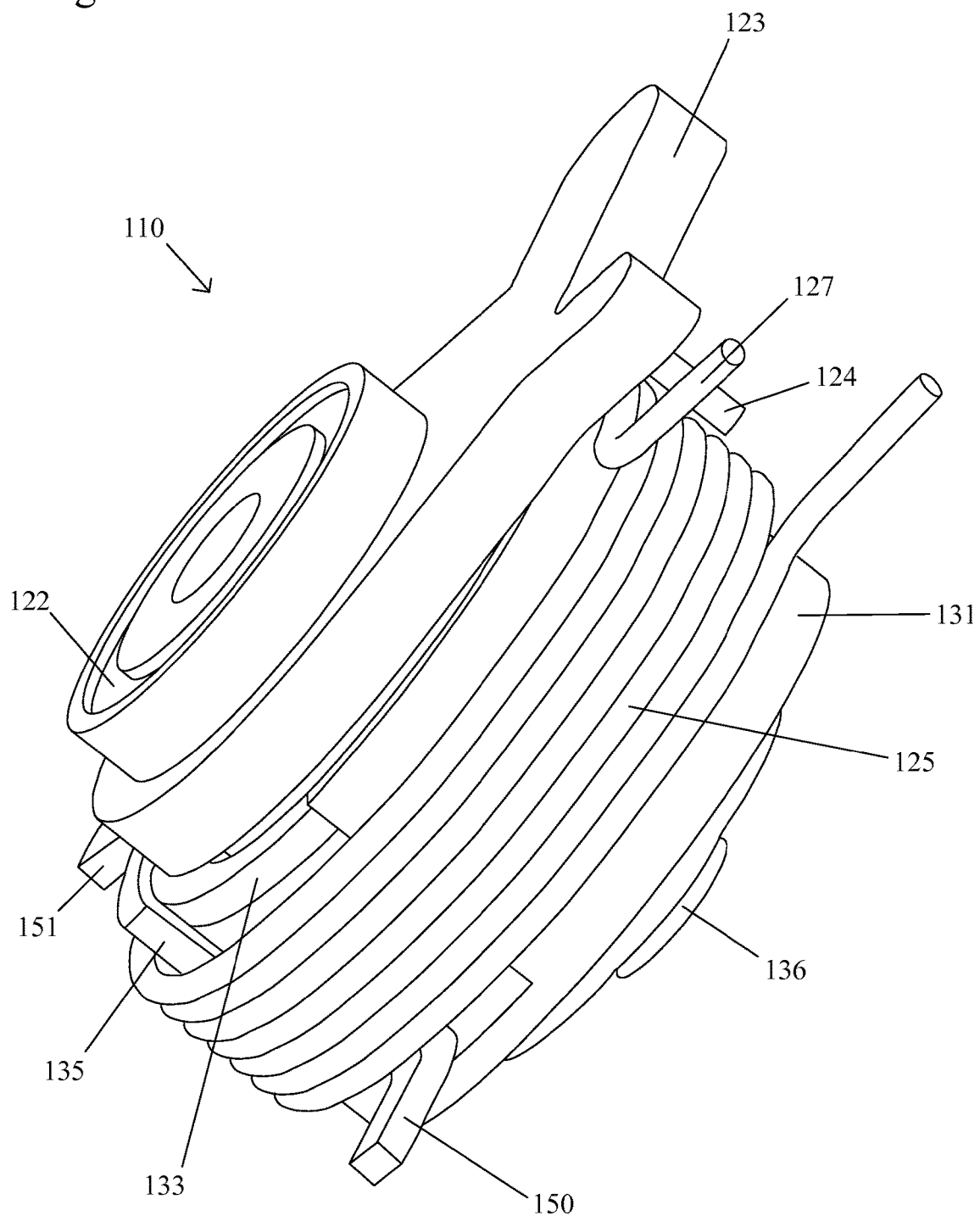
FIG. 5 shows a schematic perspective view of an assembly for a rotational tensioner in another embodiment of the present invention.
Figure 6:
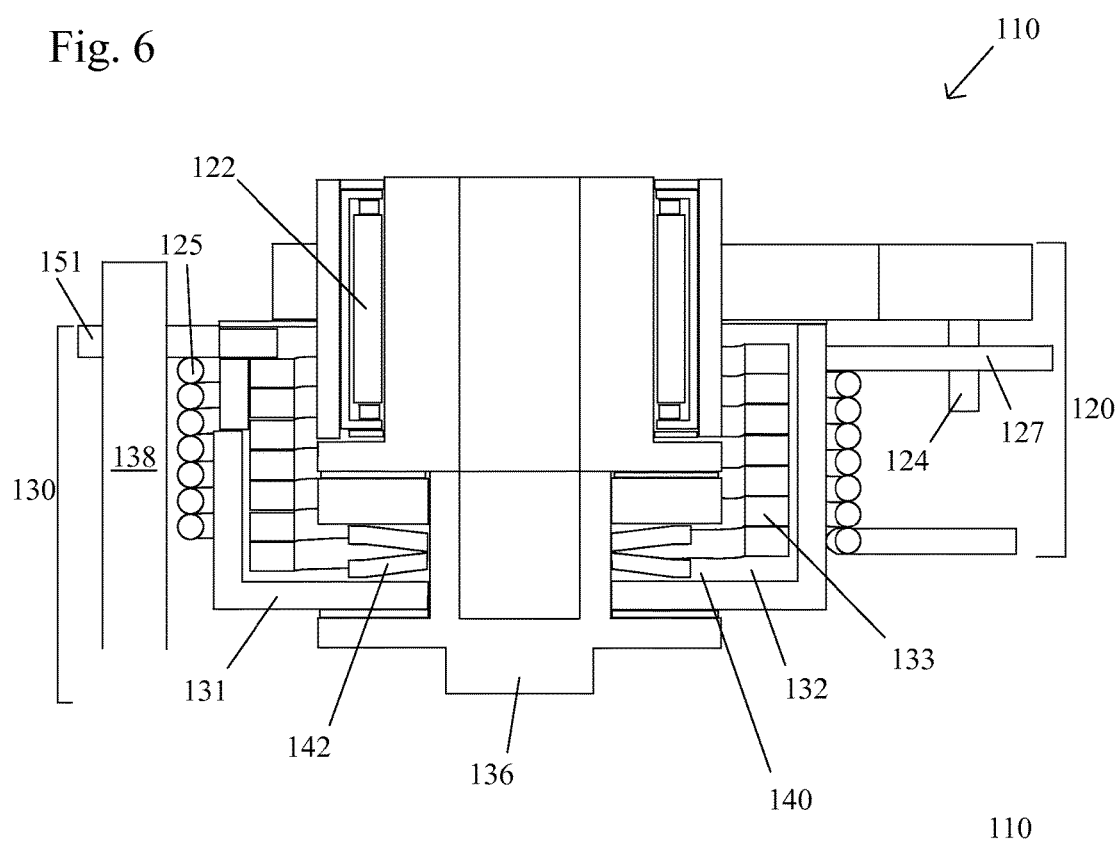
FIG. 6 shows a schematic cross sectional view of the assembly of FIG. 5 through line 6-6 of FIG. 7.
Figure 7:
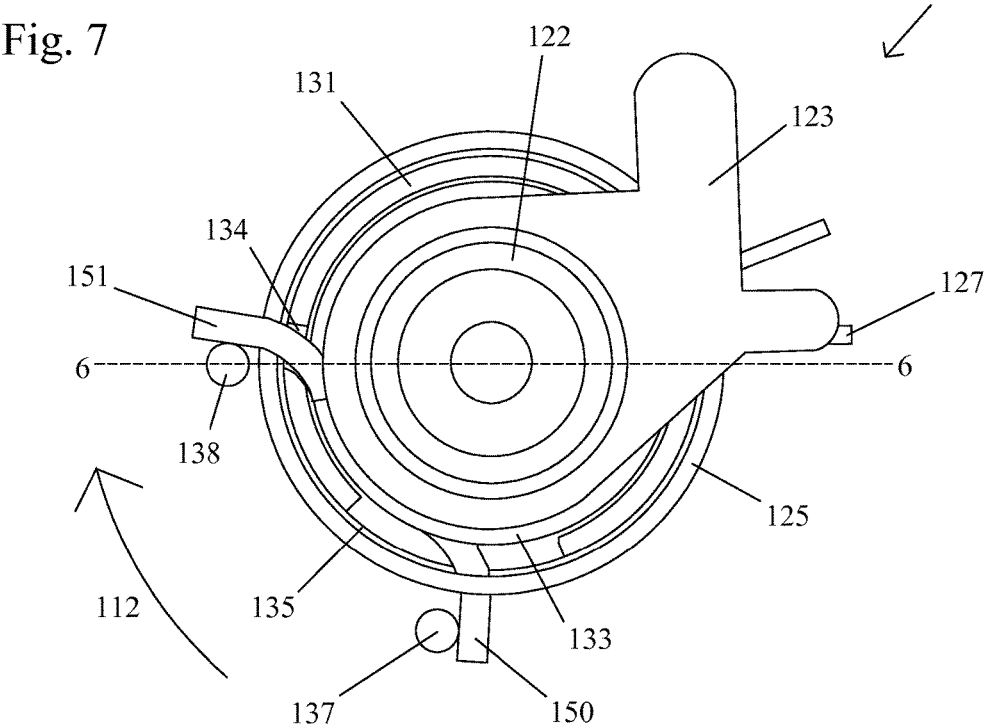
FIG. 7 shows a schematic end view of the assembly of FIG. 5.

Referring to FIG. 5, FIG. 6, and FIG. 7, the assembly 110 includes a first stage 120 and a second stage 130 coupled together by a clutch assembly 140. In this embodiment, the first and second stages 120, 130 are in a stacked configuration, with the first stage 120 being stacked on top of the second stage 130 with respect to the pivot axis, with the clutch 142 located between the two stages on the pivot axis. The first stage 120 includes a one-way bearing 122, a lift arm 123, a low rate spring ground 124, and a low rate torsion spring 125.

The second stage 130 includes a housing 131 with a cylindrical chamber 132 receiving a high rate torsion spring 133. The second stage 130 also includes a spring trap 134 in the wall of the housing 131 and a clearance window 135 in the wall of the housing 131 for biasing the high rate spring 133 to ground 137. The second stage 130 housing 131 rotates on a pin 136 extending through the second stage 130. The high rate spring ground 137 and the dead stop 138 for the high rate spring are preferably mounted to the non-rotating surface to which the tensioner is mounted. The clutch 142 transmits torque from the first stage 120 to the second stage 130 at torques below any torque required to cause the clutch to slip.

Load from a chain or belt drive applies torque to the biasing assembly 110 in a clockwise direction 112 for the orientation shown in FIG. 7. The torque forces the low rate spring ground 124 against the end 127 of the low rate spring 125, which resists clockwise rotation 112 of the lift arm 123. At low loads, the torque is not transmitted to the high rate spring 133. The high rate spring 133 is held in an energized state with one end 150 biased toward the high rate spring ground 137 and the other end 151 biased toward the dead stop 138, even when no load is applied by the chain or belt. The ground 137 and the dead stop 138 may be located directly on a mounting surface or on a mounting plate as shown in FIG. 3.

For the design shown in FIG. 7, the high rate spring 133 is energized from its free state by pushing the two ends 150, 151 away from each other, with the ground 137 and the dead stop 138 holding the two ends 150, 151 in that energized position.

In alternative designs, a high rate spring 133 may be arranged such that the two ends 150, 151 are at a free state angle with respect to each other such that the high rate spring 133 is energized from its free state by squeezing the two ends toward each other, with the ground 137 and the dead stop 138 holding the two ends in that energized position. In such a design, the two ends 150, 151 of the high rate torsion spring 133 may form a similar angle in the energized state as the angle shown in FIG. 7, but the ground 137 and dead stop 138 are now located to contact the other sides of the two ends 150, 151 of the high rate spring 133, with the first end 150 now extending from a spring trap and contacting the dead stop and the second end 151 now extending from a clearance window 135 and contacting the ground 137.

Although a lift arm 123 is shown and is coupled to a tensioner arm to receive a load from the tensioner arm for contacting the chain or belt is shown in FIG. 1 through FIG. 7, the tensioner arm may alternatively be formed directly without a lift arm by modifying the shape of the extension forming the lift arm to have a sliding surface to contact a chain or belt.

Although a housing 31, 71, 131 with walls and openings in the walls forming a spring trap 34, 134 and a clearance window 35, 135 are shown in FIG. 1 through FIG. 7, the housing 31, 71, 131 may alternatively be minimally formed as a plate rotatable with respect to the pivot axis, with a pair of pins protruding from the plate to serve as the pin trap but otherwise without walls. In such embodiments, the high rate torsion spring 33, 133 sits on top of or underneath the plate, with one end of the high rate torsion spring trapped between the pins, so that the high rate torsion spring rotates with the housing around the pivot axis.

The response of the tensioner to a load depends on the torque generated by the chain or belt drive acting on the tensioner (torque), the low rate spring torque ($T_{LRS}$) of the low rate spring 25, 125, the high rate spring torque ($T_{HRS}$) of the high rate spring 33, 133, and the torque required to cause the clutch 42, 142 to slip (Slip Torque). The action of the tensioner is described below in terms of four different operational regimes, starting from a low Torque, increasing to a high Torque, and decreasing again to a low Torque.

State 1: Torque<$T_{LRS}$

When tension in the chain or belt drive is low, the torque generated by the chain or belt drive acting on the tensioner is less than the low rate spring torque ($T_{LRS}$) of the low rate spring 25, 125, and the lift arm 23, 123 rotates about a one-way bearing 22, 122 to provide tension to the tensioner arm to prevent slack. The force on the lift arm 23, 123 is provided by a low rate torsion spring 25, 125 attached to ground 24, 64, 124 on one end and the lift arm 23, 63, 123 on the other. In this state, the second stage 30, 70, 130 is biased against ground and does not energize the first stage 20, 70, 130 or the chain or belt drive.

State 2: $T_{HRS}$> Torque> $T_{LRS}$; Torque<Slip Torque

As the tension in the chain or belt drive increases, the torque generated by the chain or belt drive acting on the tensioner becomes greater than the low rate spring torque ($T_{LRS}$) of the low rate spring 25, 125 but less than the high rate spring torque ($T_{HRS}$) of the high rate spring 33, 133 and the torque required to cause the clutch or damper 42, 82, 142 to slip. The chain or belt drive forces the lift arm 23, 63, 123 backwards, away from the chain or belt drive, which locks the one-way bearing 22, 62, 122 and transmits load through the slip clutch/damper back to the second stage housing 30, 70, 130, which acts against the high rate spring 33, 133. In this state, the tensioner is dynamically balanced.

State 3: $T_{HRS}$<Torque; $T_{LRS}$<Torque; Torque<Slip Torque

As tension in the chain or belt drive increases further, the torque generated by the chain or belt drive acting on the tensioner exceeds the high rate spring torque ($T_{HRS}$) of the high rate spring 33, 133 but is still less than the torque required to cause the clutch or damper 42, 82, 142 to slip, and the high rate spring 33, 133 is lifted off the dead stop 78, 138. As Torque increases within this stage, the high rate spring 33, 133 winds further, providing resistance to the Torque equal to kx, where k is the spring constant and is the angle of winding of the spring.

State 4: $T_{HRS}$<Torque; $T_{LRS}$<Torque; Torque> Slip Torque

When the torque generated by the chain or belt drive acting on the tensioner goes above the torque required to cause the clutch or damper 42, 82, 142 to slip, the clutch or damper slips. The clutch or damper slipping returns the high rate spring 33, 133 to the dead stop 78, 138 while simultaneously winding up the low rate spring 25, 125. In this state, the tensioner is dynamically imbalanced. If a damper 80 or clutch 42, 142 without slip is used, however, this state does not occur.

The lift arm 23, 123 transmits load from the tensioner arm to the tensioning mechanism and is preferably fixed on the outside of the clutch 42, 142 or damper 80 by a shoulder bolt and a low friction washer.

A one-way bearing 22, 62, 122 allows the lift arm 23, 63, 123 to rotate toward the tensioner arm but locks when the tensioner arm pushes against the lift arm and is preferably fixed to the inside of the clutch or damper 42, 82 142 and rotates about a bolt or pin, which is fixed to the second stage housing 30, 70, 130.

The low rate spring 25, 125 biases the lift arm 23, 63, 123 and provides a low force to index the lift arm out and biased against the tensioner arm, as the chain or belt elongates, to bias the tensioner arm against the chain or belt without over-tensioning the chain or belt.

A clutch assembly 40, 142 provides damping and protects against over-extension. In some embodiments, the clutch 42, 142 may be fixed to the second stage housing 30, 130 and is allowed to pivot freely about the bolt or pin. In essence, the clutch assembly 42, 142, includes two plates 43, 143 attached to the second stage housing 30, 130 and the lift arm 23, 123, respectively, that are pressed together by springs so that the torque between the first stage 20, 120 and the second stage 30, 130 is transmitted through a frictional interface.

The second stage housing 30, 130 rotates about a fixed pin or bearing 136, which is attached to ground 137. One end of the high rate spring 33, 133 is preferably grounded against the housing by a spring trap 34, 134 such that the spring 33, 133 resists the rotation of the housing 31, 131 and returns the housing to ground.

The high rate spring 33, 133 provides a reservoir of stored energy and is fixed to ground on both ends with a predetermined pre-load. One leg of the high rate spring 33, 133 is also contained by the spring trap 34, 134 of the second stage housing 30, 130. The ground on this end of the high rate spring 33, 133 is called the dead stop 138, because the function of the tensioner lifts and returns the high rate spring 33, 133 to this dead stop 138.

The high rate spring 33, 133 is used to store energy. As a result of a one-way bearing and geometry, the spring is never unwound regardless of the position of the tensioner. Therefore, a high spring force is only generated when the chain or belt drive inputs a high load. In this way, excessive spring load on the drive is avoided.

In some embodiments, instead of a slip clutch, a rotational damper 82 may be used. In these embodiments, the lift arm rotates 63 about a one-way bearing 62 fixed to the outside of the damper 82, the outside of the second stage housing 131 is fixed to the inside of the damper, and the second stage housing 130 rotates freely about a pin 136 or bearing. The damper 82 may be designed with slip or without slip. Also, the damper may be constructed and placed in one of a number of different ways depending on the amount of damping required.

In the case of low wear drives, where rotation due to wear is likely to be minimal, the one-way bearing 62 and low rate spring may be eliminated and the lift arm 63 may be connected directly to the damper 82, with the high rate spring being set to provide a predetermined pre-load.

In the case of torsionally inactive drives, the damper/slip clutch may be eliminated so that any damping is incidental and the tensioner operates as a sprung mechanical tensioner.

The tensioner stores spring force in the high rate spring without transmitting it to the drive. Therefore, pre-load and tensioner force may be much lower without sacrificing control. This results in higher efficiency operation, i.e. lower frictional losses, compared to conventional tensioners.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner comprising:
   a first stage (20, 60, 120) comprising:
   an arm (23, 63, 123) comprising a body having a first end extending outwardly from a second end pivotable around a pivot axis, the body receiving torque applied by a load from a chain or belt, and a first ground (24, 64, 124) extending from the body parallel to the pivot axis; and
   a low rate torsion spring (25, 125) mounted around the pivot axis and having a first end contacting the first ground (24, 64, 124) to resist rotation of the arm in a first direction around the pivot axis;
   a torque coupling (40, 80, 140) mounted around the pivot axis and receiving torque from the first stage (20, 60, 120); and
   a second stage (30, 70, 130) receiving torque transmitted by the torque coupling (40, 80, 140), the second stage comprising:
   a second stage housing (31, 71, 131) rotatable about the pivot axis, the second stage housing having a spring trap (34, 74, 134);
   a high rate torsion spring (33, 133) rotatable with the second stage housing (31, 71, 131), the high rate torsion spring having a first end (151) extending through the spring trap (34, 74, 134) of the second stage housing (31, 71, 131) and a second end (150) opposite the first end (151);
   a dead stop (78, 138), non-rotatable with respect to the pivot axis, extending parallel to the pivot axis, and contacting the first end (151) of the high rate torsion spring (33, 133), when no load is being applied to the arm (23, 63, 123) by the chain or belt; and
   a second ground (77, 137), non-rotatable with respect to the pivot axis, extending parallel to the pivot axis, and contacting the second end (150) of the high rate torsion spring (33, 133), when no load is being applied to the arm by the chain or belt;
   wherein the high rate torsion spring (33, 133) is held in an energized state by the dead stop (78, 138) and the second ground (77, 137) when no load is being applied to the arm (23, 63, 123) by the chain or belt.

2. The tensioner of claim 1 further comprising a one-way bearing (22, 62, 122) between the arm (23, 63, 123) and the torque coupling (40, 80, 140), the one-way bearing (22, 62, 122) locking when load is applied by the chain or belt drive, thereby allowing the load to be transmitted from the first stage (20, 60, 120) to the second stage (30, 70, 130) through the torque coupling (40, 80, 140).

3. The tensioner of claim 1, wherein the torque coupling is a damper (80).

4. The tensioner of claim 1, wherein the torque coupling is a clutch (40, 140).

5. The tensioner of claim 1, wherein the arm (23, 63, 123) is a lift arm, the tensioner further comprising a tensioner arm having a first end, a second end pivotally mounted around the pivot axis and a sliding surface to contact the chain or belt, wherein the tensioner arm is coupled to transmit torque from the load applied by the chain or belt to the lift arm.

6. The tensioner of claim 1, wherein the arm (23, 63, 123) is a tensioner arm having a sliding surface to contact the chain or belt.

7. The tensioner of claim 1, wherein:
   the first stage (20, 60, 120) further comprises a housing wall defining the spring trap (34, 74, 134) and a clearance window (35, 135) and defining a chamber (32, 132); and
   wherein the high rate torsion spring (33, 133) is maintained in the chamber (32, 132) of the housing of the first stage (20, 120) and the second end of the high rate torsion spring (33, 133) extends through the clearance window (35, 135).

8. The tensioner of claim 1, wherein the high rate torsion spring (33, 133) has a spring rate greater than a spring rate of the low rate torsion spring (25, 125).

9. The tensioner of claim 1, wherein the torque coupling (40, 80, 140) slips, whenever an applied torque greater than a slip torque is applied to the torque coupling (40, 80, 140) by the chain or belt through the first stage (20, 60, 120).

10. The tensioner of claim 9, wherein the slip torque is greater than a high spring torque ($T_{HRS}$) of the high rate torsion spring (33, 133) and the high spring torque ($T_{HRS}$) is greater than a low spring torque ($T_{LRS}$) of the low rate torsion spring (25, 125).

11. The tensioner of claim 10, wherein, when the applied torque is less than the low spring torque ($T_{LRS}$), the arm (23, 63, 123) rotates about a one-way bearing (22, 62, 122) between the arm (23, 63, 123) and the torque coupling (40, 80, 140) to provide tension to the chain or belt.

12. The tensioner of claim 10, wherein, when the applied torque is greater than the low spring torque ($T_{LRS}$) but less than the high spring torque ($T_{HRS}$), the arm (23, 63, 123) is forced back by the chain or belt drive, the torque is transmitted to the high rate torsion spring (33, 133), and the tensioner is dynamically balanced.

13. The tensioner of claim 10, wherein, when the applied torque is greater than the high spring torque ($T_{HRS}$) but less than the slip torque, the high rate torsion spring (33, 133) is lifted off the dead stop (78, 138) and winds further, providing additional resistance.

14. A method of storing energy in a high rate torsion spring (33, 133) of a tensioner, the method comprising the steps of:
   a) mounting the high rate torsion spring (33, 133) on a second stage housing (31, 71, 131) of the tensioner such that a first end of the high rate torsion spring extends through a spring trap (34, 74, 134) in the second stage housing (31, 71, 131), the tensioner comprising:
      a first stage (20, 60, 120) comprising:
         an arm (23, 63, 123) comprising a body having a first end extending outwardly from a second end pivotable around a pivot axis, the body receiving torque applied by a load from a chain or belt, and a first ground (24, 64, 124) extending from the body parallel to the pivot axis; and
         a low rate torsion spring (25,125) mounted around the pivot axis and having a first end located to the first ground (24, 64, 124) to resist rotation of the arm in a first direction around the pivot axis;
      a torque coupling (40, 80, 140) mounted around the pivot axis and receiving torque from the first stage (20, 60, 120); and
      a second stage (30, 70, 130) receiving torque transmitted by the torque coupling (40, 80, 140), the second stage comprising:
         the second stage housing (31, 71, 131) rotatable about the pivot axis; and
         the high rate torsion spring (33, 133) having the first end (151) extending through the spring trap (34, 74, 134) of the second stage housing (31, 71, 131) and a second end (150) opposite the first end (151);
   b) energizing the high rate torsion spring (33, 133) and pinning the first end (151) of the high rate torsion spring (33, 133) in contact with a dead stop (78, 138), non-rotatable with respect to the pivot axis and extending parallel to the pivot axis, and the second end (150) of the high rate torsion spring (33, 133) in contact with a second ground (77,137), non-rotatable with respect to the pivot axis and extending parallel to the pivot axis, such that the high rate torsion spring (33, 133) is held in an energized state by the dead stop (78, 138) and the second ground (77, 137) when no load is being applied to the arm (23, 63,123) by the chain or belt.

* * * * *